United States Patent [19]

Shimizu

[11] Patent Number: 4,872,128
[45] Date of Patent: Oct. 3, 1989

[54] HIGH SPEED DATA PROCESSING UNIT USING A SHIFT OPERATION

[75] Inventor: Toru Shimizu, Hyogo, Japan

[73] Assignee: Mitsubishi Denki Kabushiki Kaisha, Japan

[21] Appl. No.: 156,766

[22] Filed: Feb. 17, 1988

[30] Foreign Application Priority Data

Jun. 30, 1987 [JP] Japan .................. 62-164339

[51] Int. Cl.⁴ .............. G06F 7/00; G06F 15/00; G11C 19/00
[52] U.S. Cl. ................... 364/715.08; 377/79
[58] Field of Search ............ 364/715.08; 377/64, 377/69, 70

[56] References Cited

U.S. PATENT DOCUMENTS

| | | | |
|---|---|---|---|
| 3,781,819 | 12/1973 | Geng et al. | 364/715.08 |
| 4,122,534 | 10/1978 | Cesaratto | 364/900 |
| 4,338,675 | 7/1982 | Palmer et al. | 364/745 |
| 4,484,259 | 11/1984 | Palmer et al. | 364/748 |
| 4,509,144 | 4/1985 | Palmer et al. | 364/715.08 |
| 4,665,538 | 5/1987 | Machida | 364/715.08 |

Primary Examiner—Gary V. Harkcom
Assistant Examiner—Dale M. Shaw
Attorney, Agent, or Firm—Townsend and Townsend

[57] ABSTRACT

A data processing unit includes a data register, a shift width register, an absolute value generator, a shift direction control circuit, and a shifter. The shifter is responsive to an absolute value of shift width data in the shift width register and a sign of the shift width data to decide the number of shift positions and the shift direction of data in the data register for performing a shift operation.

4 Claims, 1 Drawing Sheet

HIGH SPEED DATA PROCESSING UNIT USING A SHIFT OPERATION

BACKGROUND OF THE INVENTION

The present invention relates generally to data processing units with a shift function. More particularly it relates, to a data processing unit with a shift function in which the shift direction is determined by the sign of data for specifying a shift width.

Data processing units with a shift function are widely used. FIG. 2 shows a conventional data processing unit with a shift function which includes a pair of registers 21 and 22, an arithmetic and logic unit (ALU) 23, a flags register 24, a shift width register 25, a data register 26, and a shifter 27. The shift width data for specifying the number of positions in a shift width is fed to the registers 21 and 22 from the data bus. The ALU 23 outputs an absolute value of data from the registers 21 and 22 and feeds the flags register 24 with a sign opposite that of the data. The shift width data is fed to the shift width register 25 from the data bus. The data to be shifted is fed to the data register 26 from the data bus. The data to be shifted is the one to be shifted by the shifter 27. The shifter 27 moves the data from the data register 26 by the number of positions in a shift width to the left or to the right.

In operation, the conventional data processing unit performs a shift operation in two steps. In the first step, the ALU 23 generates an absolute value of shift width data. That is, the shift width data (X) is subtracted from 0 to provide data (Y) with a sign opposite that of the difference. If X is positive, X is output on the data bus, while if Y is positive, Y is output on the data bus. At the same time, the sign of Y is set in the flags register 24. In the second step, the absolute value of the shift width data is stored in the shift width register 25. That is, if X is positive, X is stored, while if X is negative, Y is stored. The data to be shifted is stored in the data register 26. The data to be shifted 28 from the data register 26, a shift width control signal 29 from the shift width register 25, and a shift direction control signal 30 from the flags register 24 are all fed to the shifter 27, where the data to be shifted is moved by a predetermined number of bits to the left or to the right. Thus, the conventional data processing unit requires the two steps to drive the ALU and the shifter to perform a shift operation in which the shift direction is determined by a sign of data for specifying a shift width.

SUMMARY OF THE INVENTION

Accordingly, it is an object of the invention to provide a data processing unit capable of performing a shift operation, which is frequently used, in fewer steps for providing high speed data processing.

According to the invention, the absolute value of shift width specifying data and the shift direction in a shifter are determined by the sign of shift width data.

Other objects, features, and advantages of the invention will be apparent from the following description when taken in conjunction with the accompanying drawings.

DESCRIPTION OF THE PREFERRED EMBODIMENTS

Figure 1:
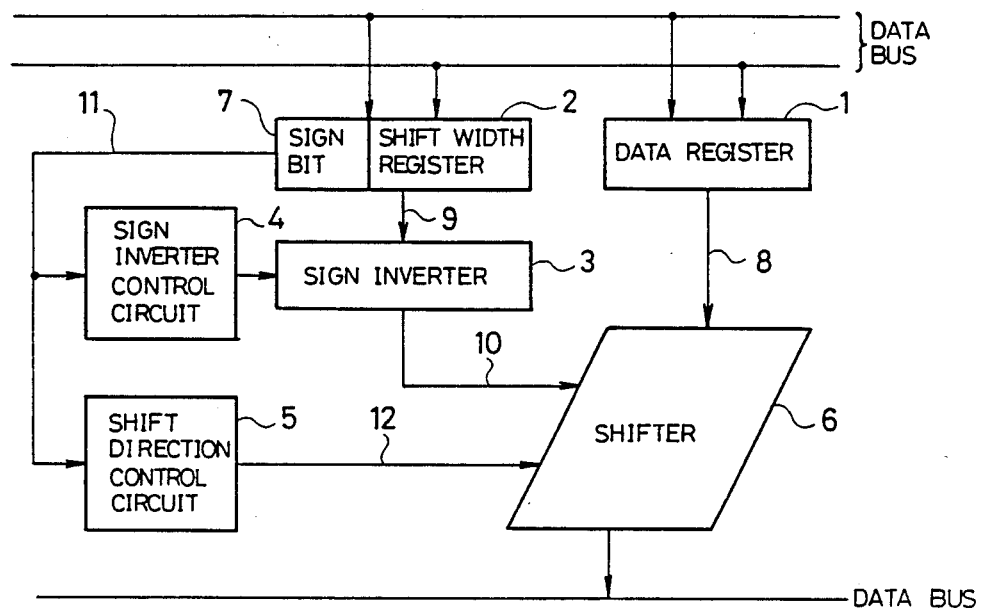
FIG. 1 is a block diagram of a data processing unit according to an embodiment of the invention.
Figure 2:
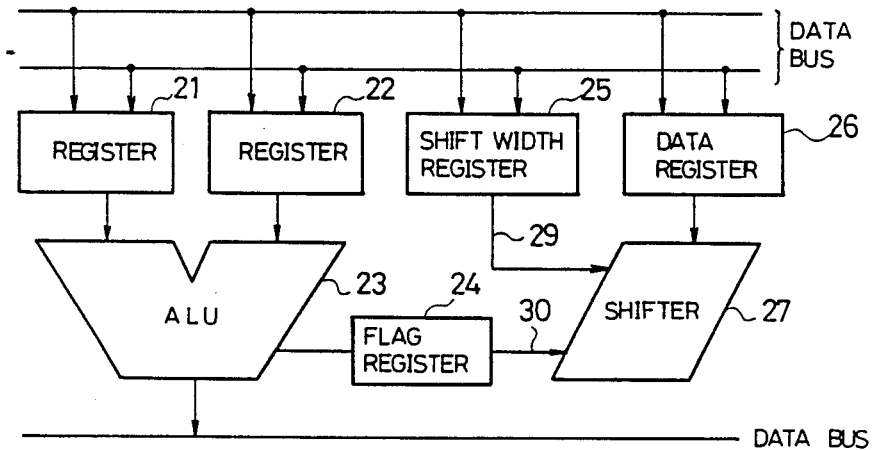
FIG. 2 is a block diagram of a conventional data processing unit with a shift function.

FIG. 1 shows a data processing unit according to an embodiment of the invention. This data processing unit includes a data register 1, a shift width register 2, a sign inverter 3, a sign inversion controlling circuit 4, a shift direction control circuit 5, and a shifter 6. The data to be shifted is fed to the data register 1 from the data bus. The shift width data for specifying the number of positions in a shift width is fed to the shift width register 2. The sign inverter 3 is provided to invert the sign of data stored in the shift width register 2. The sign inverter control circuit 4 is provided to control the operation of the sign inverter 3. The shift direction control circuit 5 generates a shift direction control signal corresponding to a sign of data stored in the shift width register 2. The shifter 7 is provided to move data by the specified number of positions to the left or right. The sign inverter 3 and the sign inverter control circuit 4 constitute an absolute value generator 13.

In operation, data stored in the shift width register 2 is represented in the binay notation and negative data is represented in the two's complement notation. The sign bit 7 is the most significant bit of data stored in the shift width register 2. If the sign data 11 at the sign bit 7 is positive, the sign inverter control circuit 4 controls the sign inverter 3 to output shfit width data 9 as a shift width control signal 10. The shift direction control circuit 5 generates a left shift signal as a shift direction control signal 12. As a result, the shifter 6 moves data 8 in the data register 1 to the left by the number of bits equal to the absolute value of data in the shift width register 2.

If, on the other hand, the sign data 11 at the sign bit 7 is negative, the sign inverter control circuit 4 controls the sign inverter 3 to output two's complement data of shift width data 9 as a shift width control signal 10. The shift direction control circuit 5 generates a right shift signal as a shift direction control signal 12. As a result, the shifter 6 moves data 8 in the data register 1 to the right by the number of bits equal to the absolute value of data in the shift width register 2.

As has been described above, according to the invention, data to be shifted and data for specifying the number of positions in a shift width are stored in first and second registers, respectively. The sign inversion operation and the shift direction are controlled by the sign of the data in the second register which determines the direction to shift the data of the first register. The shift instruction is controlled by a single step for driving the shifter using the sign of the data for specifying the shift width, thus providing high speed data processing.

While a preferred embodiment of the invention has been described using specific terms, such description is for illustrative purposes only. It is to be understood that changes and variations may be made without departing from the spirit and scope of the invention as recited in the appended claims.

what is claimed is:

1. A data processing unit comprising:
   a data register for storing data to be shifted;
   a shift width register for storing shift width data for specifying that said data to be shifted be moved by a predetermined shift width;

an absolute value generator responsive to a sign of said shift width data to compute and store an absolute value of said shift width data;

a shift direction control circuit responsive to said sign of said shift width data to control a shift direction; and a shifter for moving said data to be shifted by a shift width specified by the absolute value of said shift width data to a direction determined by said shift direction control circuit.

2. The data processing unit of claim 1, wherein said shift width register is provided with a location for storing said sign of said shift width data.

3. The data processing unit of claim 1, wherein said absolute value generator comprises:
 a sign inverter for storing said shift width data; and
 a sign inverter control circuit responsive to said sign of said shift width data to invert said shift width data for generating an absolute value of said shift width data.

4. The data processing unit of claim 3, wherein said shift width register is provided with location for storing said sign of said shift width data.

* * * * *